US008325712B2

(12) United States Patent
Buckley et al.

(10) Patent No.: US 8,325,712 B2
(45) Date of Patent: Dec. 4, 2012

(54) SYSTEM AND METHOD FOR MANAGING A CIRCUIT SWITCHED CALL USING ALTERNATIVE SIGNALING AT THE ESTABLISHMENT OF A SUCCESSFUL SESSION SET-UP

(75) Inventors: Adrian Buckley, Tracy, CA (US); John-Luc Bakker, Keller, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 1126 days.

(21) Appl. No.: 12/197,782

(22) Filed: Aug. 25, 2008

(65) Prior Publication Data

US 2009/0052441 A1    Feb. 26, 2009

Related U.S. Application Data

(60) Provisional application No. 60/957,651, filed on Aug. 23, 2007, provisional application No. 60/988,636, filed on Nov. 16, 2007.

(51) Int. Cl.
 *H04L 12/66* (2006.01)
(52) U.S. Cl. .................. 370/352; 370/356; 370/355
(58) Field of Classification Search ................. None
See application file for complete search history.

(56) References Cited

U.S. PATENT DOCUMENTS

| 7,277,702 | B2 * | 10/2007 | Ropolyi et al. | 455/433 |
| 2007/0058788 | A1 * | 3/2007 | Mahdi et al. | 379/88.17 |
| 2008/0159276 | A1 * | 7/2008 | Kuusinen et al. | 370/356 |
| 2010/0046501 | A1 * | 2/2010 | Witzel et al. | 370/352 |
| 2010/0157985 | A1 * | 6/2010 | Nakada et al. | 370/352 |

OTHER PUBLICATIONS

European Examination Report; Application No. 08828015.1; Sep. 23, 2011; 4 pages.
EP Second Examination dated Dec. 28, 2010, EP Application No. 08828015.1; 3 pgs.
PCT International Preliminary Report on Patentability; PCT Application No. PCT/US2008/074228; Dec. 12, 2009; 6 pgs.
3GPP TSG SA WG2 Architecture—S2#58; 11-ps. Origination Session Coordination; Nortel, Nokia, Nokia Siemens Networks; S2-072685; Orlando, Florida; Jun. 25-29, 2007; 3 pgs.
3GPP TSG SA WG2 Architecture—S2#58; 11-ps origination—DN used for Bearer Control Signalling Session; Nortel, Nokai, Nokia Siemens Networks; S2-072686; Orlando, Florida; Jun. 25-29, 2007.
3GPP TR 23.892 V1.1.0; 3rd Generation Partnership Project; Technical Specification Group Services and System Aspects; IP Multimedia System (IMS) Centralized Services; Release 8; Jul. 2007; 99 pgs.
PCT International Search Report; PCT Application No. PCT/US2008/074228; Apr. 1, 2009; 3 pgs.
PCT Written Opinion of the International Searching Authority; PCT Application No. PCT/US2008/074228; Apr. 1, 2009; 7 pgs.

(Continued)

*Primary Examiner* — Duc C Ho
(74) *Attorney, Agent, or Firm* — Conley Rose, P.C.; J. Robert Brown, Jr.

(57) ABSTRACT

A method for providing a user agent (UA) with configuration data for a subsequent session is provided. The method includes the UA sending a first setup message over a first control signalling to control a second control signalling. The method further includes the UA sending a second setup message via the second control signalling, the second setup message initiating procedures to establish a circuit switched-based bearer. The method further includes a network component sending the UA a control message via the first control signalling indicating that a session has been established, the control message containing information related to configuration data for a subsequent session.

26 Claims, 7 Drawing Sheets

OTHER PUBLICATIONS

European Examination Report; European Application No. 08828015.1; May 6, 2011; 4 pages.

European Examination Report; EP Patent Application No. 08828015.1; Aug. 2, 2010; 3 pgs.

Bakker, John-Luc, et al.; U.S. Appl. No. 12/189,679, filed Aug. 11, 2008; Title: "System and Method for Configuring and Executing Communication Diversion with a Globally Routable User Agent Uniform Resource Identifier"; Specification 35 pgs.; 5 Drawing Sheets (Figs. 1-6).

Bakker, John-Luc, et al.; U.S. Appl. No. 12/189,683, filed Aug. 11, 2008; Title: "Communication Diversion with a Globally Routable User Agent Uniform Resource Indentifier System and Method"; Specification 44 pgs.; 5 Drawing Sheets (Figs. 1-6).

European Examination Report; Application No. 08828015.1; Feb. 2, 2012; 5 pages.

European Examination Report; Application No. 08828015.1; Jun. 15, 2012; 4 pages.

* cited by examiner

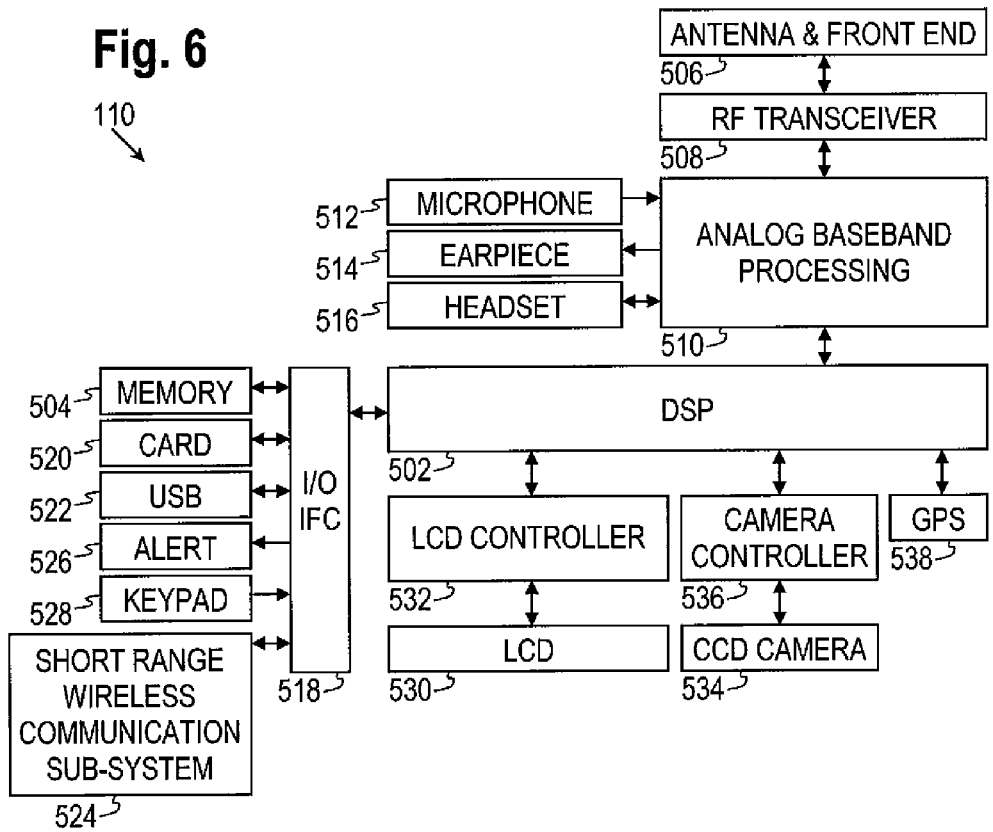
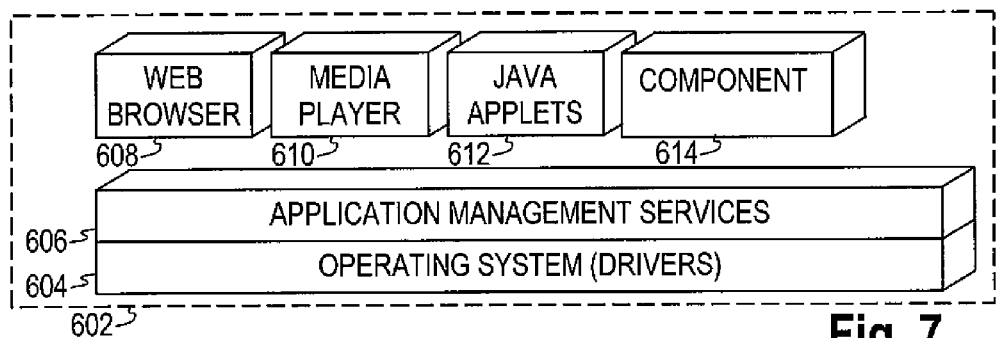

SYSTEM AND METHOD FOR MANAGING A CIRCUIT SWITCHED CALL USING ALTERNATIVE SIGNALING AT THE ESTABLISHMENT OF A SUCCESSFUL SESSION SET-UP

CROSS-REFERENCE TO RELATED APPLICATIONS

The present application claims priority to U.S. Provisional Patent Application No. 60/957,651, filed Aug. 23, 2007, by Adrian Buckley, et al, entitled "System and Method for Managing CS Call Using Alternative Signaling at the Establishment of a Successful Session Set-Up", and to U.S. Provisional Patent Application No. 60/988,636, filed Nov. 16, 2007, by Adrian Buckley, et al, entitled "System and Method for Managing CS Call Using Alternative Signaling at the Establishment of a Successful Session Set-Up", both of which are incorporated by reference herein as if reproduced in their entirety.

BACKGROUND

The IP (Internet Protocol) Multimedia Subsystem (IMS) is a standardized architecture for providing multimedia services and voice-over-IP calls to both mobile and fixed user agents (UAs). The Session Initiation Protocol (SIP) been standardized and governed primarily by the Internet Engineering Task Force (IETF) as a protocol for setting up and managing IMS-based calls. As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as fixed line telephones, desktop computers, set-top boxes, or network nodes. When a UA is a network node, the network node could act on behalf of another function such as a UA or a fixed line device and simulate or emulate the UA or fixed line device. For example, for some UAs, the IMS SIP client that would typically reside on the device actually resides in the network and relays SIP message information to the device using optimized protocols. In other words, some functions that were traditionally carried out by a UA can be distributed in the form of a remote UA, where the remote UA represents the UA in the network. The term "UA" can also refer to any hardware or software component that can terminate a communication session that could include, but is not limited to, a SIP session. Also, the terms "user agent", "UA", "user equipment", "UE", "UA", and "node" might be used synonymously herein.

Some UAs communicate in a circuit switched mode, wherein a dedicated communication path exists between two endpoints. For the duration of a call or session, all data exchanged between the two endpoints travels along the single path. Some UAs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

Communications that take place via circuit switching can be said to occur in the circuit switched domain and communications that take place via packet switching can be said to occur in the packet switched domain. Some UAs may be capable of communicating in both the circuit switched domain and the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). A TDMA-based network may implement one or more standards such as 3GPP Global System for Mobile Communications (GSM) or 3GPP General Packet Radio Service (GPRS).

GSM is an example of a wireless network standard that uses only the circuit switching mode. Examples of wireless network standards that use only packet switching include GPRS, CDMA 1x EV-DO, Worldwide Interoperability for Microwave Access (WiMAX), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. SIP is an example of an application-layer protocol that can be used in a packet switched wireless network.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a block diagram of a UA operable for some of the various embodiments of the disclosure.

FIG. 7 is a diagram of a software environment that may be implemented on a UA operable for some of the various embodiments of the disclosure.

DETAILED DESCRIPTION

Figure 1:
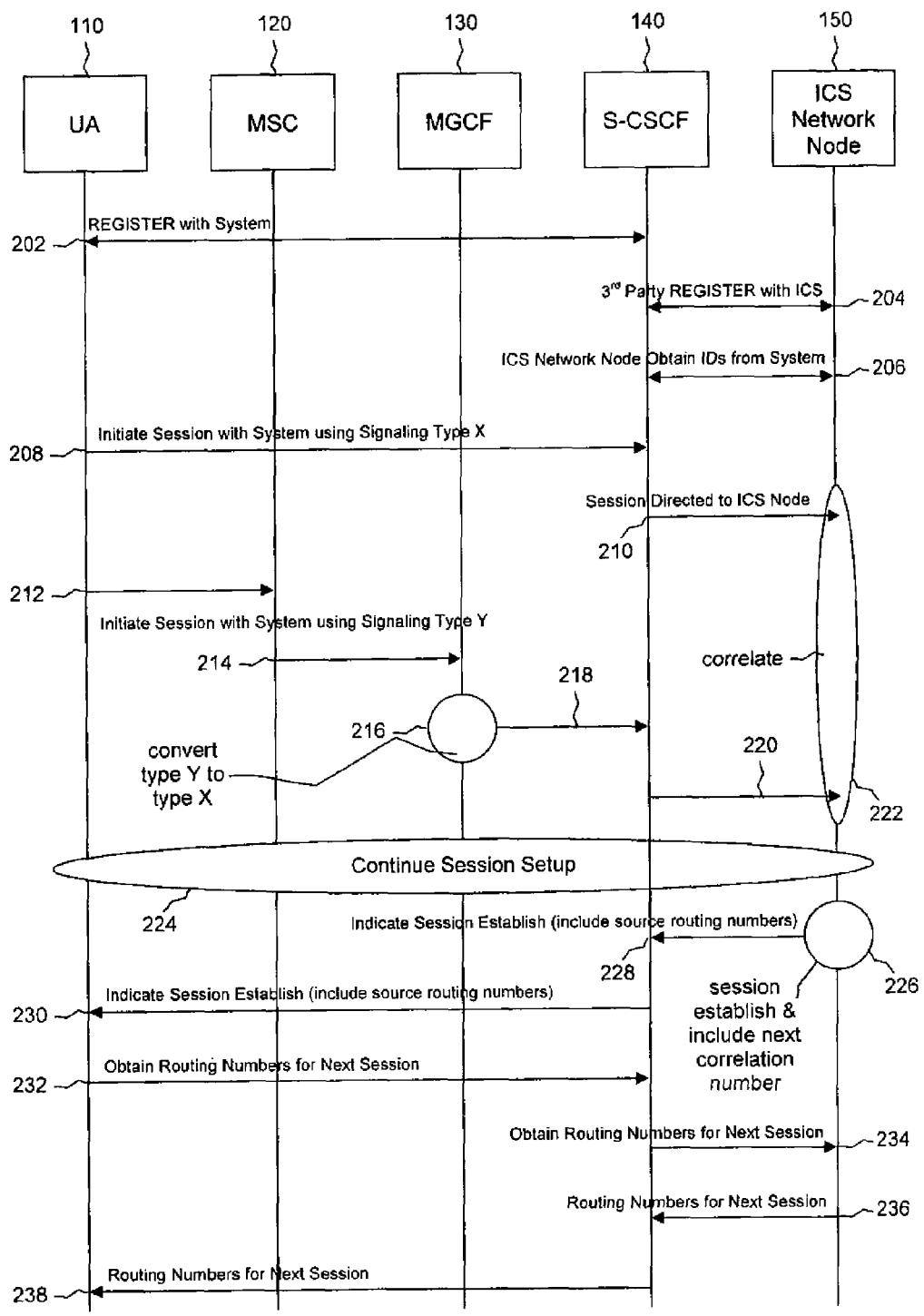
FIG. 1 is a call flow diagram for providing a UA with session identifiers that the UA can use on subsequent sessions according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method for providing a user agent (UA) with configuration data for a subsequent session is provided. The method includes the UA sending a first setup message over a first control signalling to control a second control signalling. The method further includes the UA sending a second setup message via the second control signalling, the second setup message initiating procedures to establish a circuit switched-based bearer. The method further includes a network component sending the UA a control message via the first control signalling indicating that a session has been established, the control message containing information related to configuration data for a subsequent session.

In an alternative embodiment, a user agent (UA) is provided. The UA includes a processor configured to send a first setup message over a first control signalling to control a second control signalling. The UA is further configured to send a second setup message via the second control signalling, the second setup message initiating procedures to establish a circuit switched-based bearer. The UA is further configured to receive a control message via the first control signalling indicating that a session has been established, the control message containing information related to configuration data for a subsequent session.

In an alternative embodiment, a network component is provided. The network component includes a processor configured to receive a first setup message that indicates that a circuit switched session is to be initiated. The network component is further configured to receive a second setup message that can be correlated with the first setup message. The network component is further configured to send a control message containing information related to configuration data for a subsequent session.

Currently, calls might be set up using circuit switching by following, for example, 3GPP technical specification (TS) 24.008. It has been proposed that packet switching, such as IMS, be used for call services. Under the proposal, SIP would be used to control the call, and 24.008 procedures would act as a slave signaling system used to set up a bearer to the IMS system. A UA might use standard circuit switching procedures to set up the circuit switched call. For example, the UA might send a circuit switched SETUP message to the directory number (DN) of a remote user agent (RUA), which might also be referred to as an IMS centralized services (ICS) network node. Procedures that the UA might use to determine the RUA DN to which to send the setup messages can be found in U.S. patent application Ser. No. 11/833,767, entitled "Methods and Apparatus for Obtaining Variable Call Parameters Suitable for Use in Originating a SIP Call via a Circuit-Switched Network from a User Equipment Device", which is incorporated by reference herein as if reproduced in its entirety.

The RUA can combine the SIP setup message and the circuit switched setup message into a single setup message that it sends to the RUA using the RUA DN. The DN associated with the RUA may be static (i.e., configured beforehand to the UA) or dynamic (i.e., the UA learns it on a per-call basis during the SIP signaling). If the latter, the RUA would typically acknowledge the SIP setup message with the DN before the UA is able to establish the circuit switched call.

In an embodiment, the RUA then provides the UA with additional RUA DNs that the UA can use on subsequent sessions. In some cases, the RUA sends the UA a list of RUA DNs for future use. In other cases, the RUA sends the UA information on the location where the additional RUA DNs for subsequent session establishments can be found. The subsequent session establishments could be originated by the UA or terminated at the UA or could be an invocation of a session transfer from a first domain to a second domain.

FIG. 1 is a call flow diagram depicting an example of a generic procedure for how a UA can be configured with routing information to control circuit switched calls. At event 202, a UA 110 performs a registration procedure with a serving call session control function (S-CSCF) 140 or a similar component/network node. The registration procedure uses a first signaling type, referred to here as signaling type X. Signaling type X might be, for example, SIP or a protocol similar to SIP embedded in Unstructured Supplementary Service Data (USSD).

At event 204, the S-CSCF 140 performs a third party registration procedure with a RUA, which might be an ICS network node 150 or a similar component. The ICS network node 150 is responsible for bridging the signaling type X control signaling with a second type of control signaling used with a second type of bearer channel. The second signaling type is referred to here as signaling type Y. Signaling type Y might be, for example, a circuit switched protocol that follows 3GPP TS 24.008. Alternatively, signaling type Y might be a packet switched protocol, and signaling type X might be a circuit switched protocol. In the remainder of the example of FIG. 1, signaling type X is a packet switched protocol, and signaling type Y is a circuit switched protocol. The signaling may be carried over a first bearer type, which might be IP, for example, or a second bearer type, which might be, for example, GERAN, UTRAN, CDMA2000, IS-95, etc.

At event 206, the ICS network node 150 obtains all the identities of the UA 110 that are associated with the registration. When the registration was performed, the UA 110 might have used only one identity to identify itself, or it could use many different identities when it initiates a session. The ICS network node 150 retrieves any applicable identities from the S-CSCF 140. Alternatively, the S-CSCF node 140 can be configured such that these identities are embedded within another message, such as but not limited to at event 204, such that ICS network node 150 receives them.

At event 208, the UA 110 initiates a first session using signaling type X. The session initiation message at event 208 has sufficient information needed at the ICS network node 150 to correlate the session request with the bearer control session established with the ICS network node 150 in events 212 through 220. At event 210, the S-CSCF 140 is configured to direct the session to the ICS network node 150. Standard IMS procedures to route the SIP session setup message to the ICS network node 150 might be invoked as part of standard processing at the S-CSCF 140. At event 212, the UA 110 initiates a second session using signaling type Y.

The UA 110 initiates standard circuit switched procedures for establishing a circuit switched originated call with the ICS network node 150 to establish the bearer control signaling session with the ICS network node 150. For example, the UA 110 might send a circuit switched SETUP message to the DN associated with the ICS network node 150. The second session initiation is directed to a mobile switching center (MSC) 120, which then directs the second session initiation to a media gateway control function (MGCF) 130 at event 214. At event 216, the MGCF 130 converts the type Y signaling to type X signaling. At event 218, the MGCF 130 sends the converted signaling to the S-CSCF 140, which then is configured to send the signaling to the ICS network node 150 at event 220.

At event 222, the ICS network node 150 correlates the type X signaling from the first session with the converted type X signaling from the second session. That is, the ICS network node 150 combines the offers received for the Session Control Signaling and Bearer Control Signaling as one offer towards the party that the UA 110 is calling. The offer is used to establish the voice media sent towards other party and follows the regular IMS procedures for a VoIP offer for voice media. At event 224, standard session startup procedures continue.

At event 226, a session is established between the UA 110 and the called party. In an embodiment, the ICS network node 150 at this point provides information regarding at least one correlation number, source routing number, or session identifier that the UA 110 can use for subsequent sessions. In some cases, the information might be the session identifiers themselves; in other cases, the information might be a location where the UA 110 can retrieve the session identifiers. For example, a message can be sent to the UA 110 that includes the location of a list (the list can have zero to many entries) of session identifiers that can be used for other sessions. These identifiers could be for the next session origination by the UA 110, for a session termination at the UA 110, or for session continuity between different domains. The session identifiers might be selected randomly, from a pool of session identifiers, or in some other manner using some algorithm or sequentially either in forward or reverse direction. Each session identifier could include a timer value indicating how long the session identifier is valid. The timer value could be a specific time and day or it could be a value in seconds or minutes. The information could be coded in, but is not limited to, XML or another coding scheme. The information might then be stored in the UA 110 in either internal memory or a form of removable memory such as, but not limited to, Compact flash, MicroSD, Memory Stick, R-UIM, (U)SIM, etc. The session identifiers might be, for example, SIP URIs, Tel URIs, E.164 numbers, etc.

At event 228, the ICS network node 150 sends the S-CSCF 140 an indication that the session has been established and includes the information on the session identifiers, referred to here as routing numbers. At event 230, the S-CSCF 140 sends the UA 110 the indication that the session has been established and includes the information on the routing numbers. At event 232, the UA 110 sends a message to the S-CSCF 140 requesting to obtain the routing numbers. At event 234, the S-CSCF 140 sends a message to the ICS network node 150 requesting to obtain the routing numbers. As an alternative, the message may go directly from the UA 110 to the ICS network node 150. At event 236, the ICS network node 150 provides the routing numbers to the S-CSCF 140. At event 238, the S-CSCF 140 provides the routing numbers to the UA 110. If the UA 110 wishes to originate another session, it can use a new routing number that has been provided in the session establishment message for control signaling Y.

Figure 2:
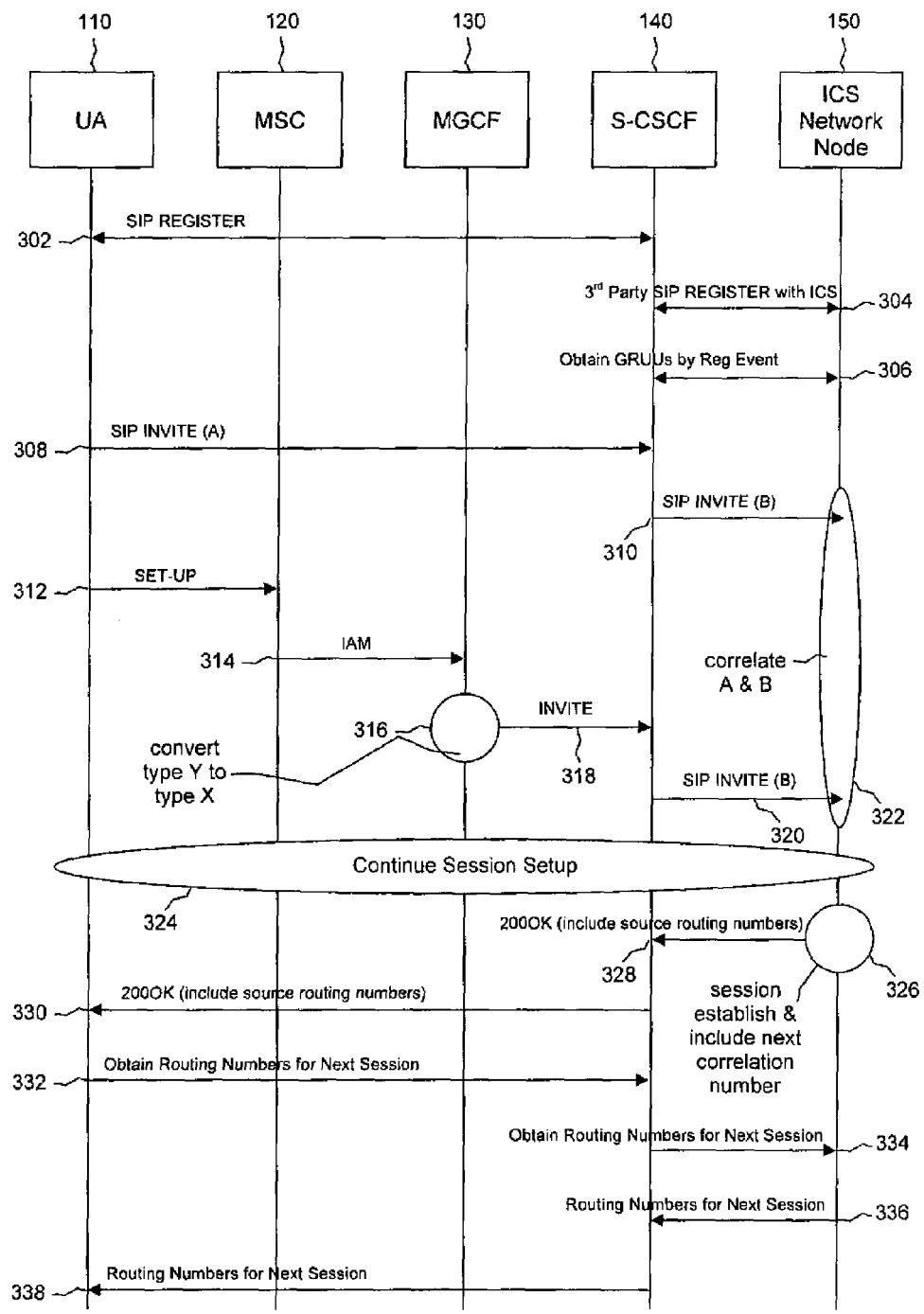
FIG. 2 is an alternative call flow diagram for providing a UA with session identifiers that the UA can use on subsequent sessions according to an embodiment of the disclosure.

FIG. 2 is a call flow diagram depicting an example of a more specific procedure for how the UA 110 can be configured with routing information to control circuit switched calls. In this case, type X is SIP, and type Y is a circuit switched protocol that follows 3GPP TS 24.008. Many of the events in FIG. 2 are similar to the events in FIG. 1, except that some of the steps in FIG. 2 are more detailed. For example, as in FIG. 1, when the UA 110 registers with the system at event 302, the ICS network node 150 receives a third party registration at event 304. As part of the ICS network node's functionality, it can subscribe to the reg event package and receive all the public user identities that are registered against the UA 110. Alternatively, the S-CSCF 140 could have been configured to include the public user identities in the third party SIP REGISTER request. At event 306, instead of generic identifiers being obtained as in FIG. 1, the ICS network node 150 can also receive all the globally routable user agent URIs (GRUUs) for the UA 110.

At event 308, the UA 110 generates a SIP INVITE initiating a session toward the called party and sends it toward the S-CSCF 140. The UA 110 also generates an outgoing circuit switched call. The UA 110 may receive back a SIP 408 Request Timeout indicating that the network has timed out and needs to repeat the operation. In this case, the UA 110 will repeat sending the SIP INVITE followed by the circuit switched call setup using the same ICS routing number (ICSRN). Alternatively, the UA 110 may receive back a 500 Server Internal Error. In this case, the UA 110, if it so desires, may convert to a non-ICS UA and reattempt the call using standard circuit switched procedures where the B number in the 24.008 message is the desired B number the UA 110 wishes to contact.

The ICS network node 150 at some point might receive a SIP INVITE request from the UA 110 directly. This message can be identified by the P-Network-Access-Info header containing a value such as "IEEE-802.11", "IEEE-802.11a", "IEEE-802.11b", "IEEE-802.11g", "IEEE-802.11n", "3GPP-GERAN", "3GPP-GERAN-ICS-CS", "3GPP-UTRAN-ICS-CS", "3GPP-UTRAN-FDD", "3GPP-UTRAN-TDD", or other value. The ICS network node 150 can then wait a period of time (TIMER X) to receive the incoming INVITE from the UA 110 as generated by the circuit switched SET-UP message at event 312. This INVITE can contain an R-URI such that by inspection the ICS network node 150 can correlate the two SIP INVITES at event 322. If the timer expires, an error message can be sent back to the UA 110 with a corresponding SIP cause value. Values could include but are not limited to a SIP 408 Request Timeout. In addition, the ICS network node 150 could also send back a 500 Server Internal Error. Events 314 through 320 might be standard SIP session initiation events.

Call setup then continues at event 324. At some point before a 200 (OK) response is sent back to the UA 110, the ICS network node 150 assigns one or more routing identities or session identifiers. The identities could be in the 200 (OK) response but also could be referred to using functionality per RFC 4483. These identities could be used for, but are not limited to, subsequent ICS mobile originated or mobile terminated operations or voice call continuity invocation. The identities may be in the form of an E.164 number, a SIP URI, or a Tel URI. Each identify can have an identifier indicating what it is for and a timer value. The timer value might specify how long a session identifier is valid. Allowing the validity of a session identifier to expire can reduce the total number of session identifiers that are needed and can prevent ambiguities that might arise if two or more sessions used the same identifier.

If the UE 110, after events 328 and 330, receives back a 200 (OK) response containing a body (part) or Content type per RFC 4483, then at events 332 and 334 it retrieves the data stored at that address using a mechanism such as HTTP GET. The data is sent to the UA 110 at events 336 and 338. The UA 110 might then store this received information. The received information may include, but is not limited to, an E.164 for subsequent mobile originated operations, an E.164 for subsequent mobile terminated operations, an E.164 for voice call continuity invocation from IMS to circuit switched, a SIP URI for voice call continuity invocation from circuit switched to IMS, and a Tel URI for either of the first three of these options. Each number may also contain a timer value, IMS centralized service node configuration information, an ICSRN E.164 start address number, and/or the number of the ICSRN to be allocated or the last E.164 start address number. In addition, the lifetime of a session identifier might be included, as well as a quarantine time of a session identifier; that is, a length of time that a session identifier cannot be used after it has been assigned back to a pool of session identifiers.

Figure 3:
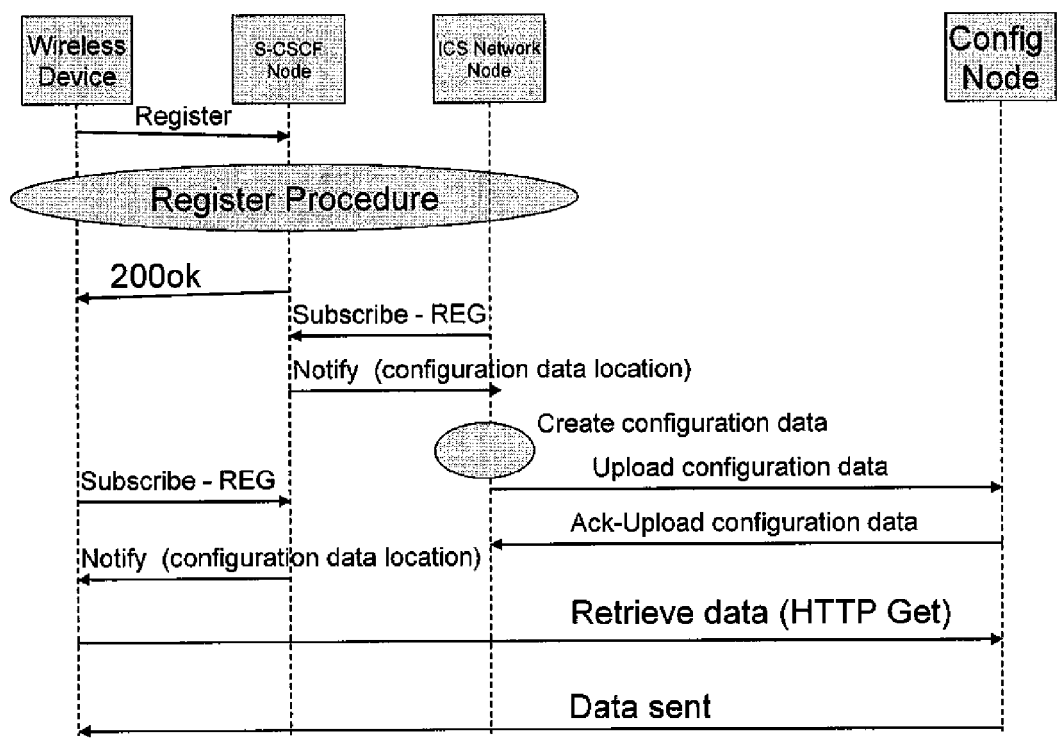
FIG. 3 is another alternative call flow diagram according to an embodiment of the disclosure.

An alternative embodiment is illustrated in FIG. 3. In this embodiment, when a UA registers with the IMS network, part of the procedure is that a home subscriber server (HSS) will download a profile of data into the S-CSCF. One of the parameters might be a URL that identifies the location where the configuration data for the subscriber is stored.

When the UA registers with the network and the third party registration is performed, the ICS network node then might subscribe to the Reg Event package to obtain all the Public User IDs and their corresponding GRUUs for that subscriber. As part of this, it might also receive a Content type per RFC 4483 describing the location where the configuration data is to be stored. Once the ICS network node has this, the ICS network node creates the configuration data and uploads it to the configuration node database per the URL received from the content type in the Notify.

As part of the SIP registration, the UA may subscribe to the Reg Event package, which delivers information back to the UA. The message that comes back, an example being a SIP NOTIFY request, can contain a Content type per RFC 4483 which contains the location of the configuration information needed by the UA which was downloaded from the HSS per the paragraph above. This information can be retrieved from the URL as specified in the content type and can be stored (in either removable [see list above of types] or internal memory) and used for the initial session establishments by the UA for originated, terminated, or session continuity operations. For example, the UA could use the information in a SIP INVITE request sent to the S-CSCF.

The following is an example of a SIP Subscribe message that the UA could use.

```
SUBSCRIBE sip:user_aor_1@example.net SIP/2.0
From: <sip:user_aor_1@example.net>;tag=27182
To: <sip:user_aor_1@example.net>
Call-Id: gbjg0b@ua.example.com
CSeq: 45001 SUBSCRIBE
Route: <sip:proxy.example.net;lr>
Event: reg
Expires: 3600
Accept: application/reginfo+xml
Contact: <sip:user_aor_1@example.net;gr=hha9s8d-999a>
Content-Length: 0
```

Figure 4:
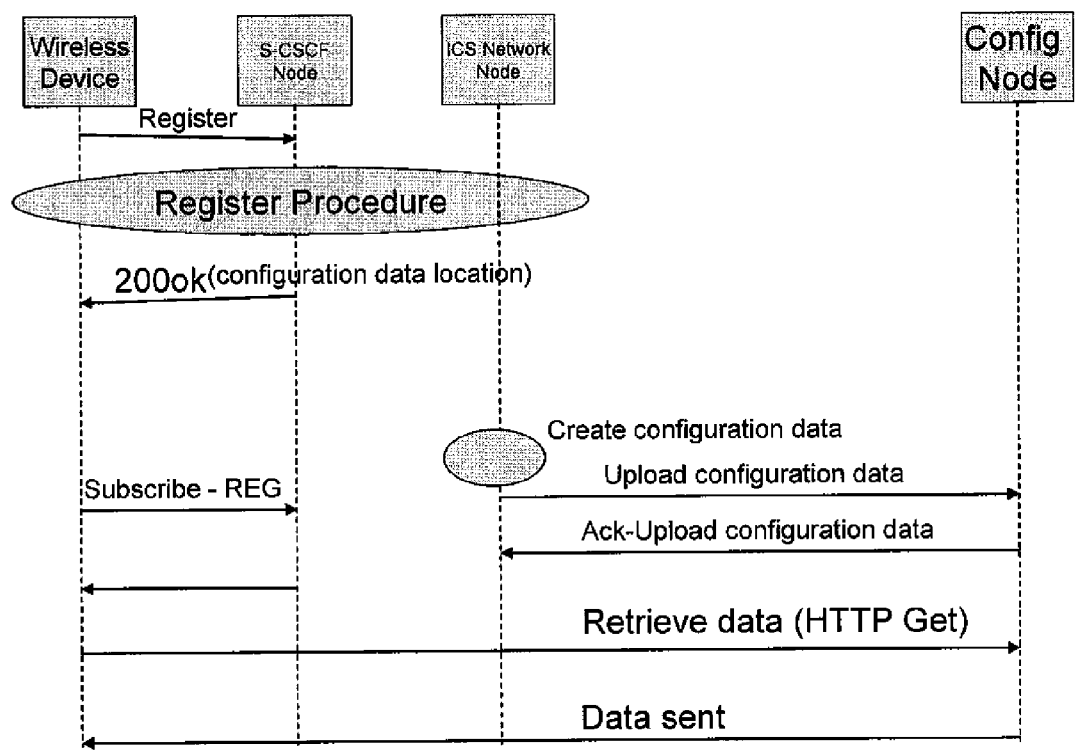
FIG. 4 is yet another alternative call flow diagram according to an embodiment of the disclosure.

An alternative embodiment is illustrated in FIG. 4. In this embodiment, when the UA registers with the IMS network, part of the procedure is that the HSS will download a profile of data into the S-CSCF. One of the parameters might be a URL that identifies the location where the configuration data for the subscriber is stored.

When the UA registers with the network and the third party registration is performed, the ICS network node then might subscribe to the Reg Event package to obtain all the Public User IDs and their corresponding GRUUs for that subscriber. As part of this, it might also receive a Content type per RFC 4483 describing the location where the configuration data is to be stored. Once the ICS network node has this, the ICS network node creates the configuration data and uploads it to the configuration node database per the URL received from the content type in the SIP NOTIFY request.

As part of the SIP registration process, a 200 (OK) request goes back containing a Content type per RFC 4483 which contains the location of the configuration information needed by the UA which was downloaded from the HSS per the paragraph above. This information can be retried from the URL as specified in the content type and can be stored (in either removable [see list above of types] or internal memory) and used for the initial session establishments by the UA for originated, terminated, or session continuity operations. For example, the UA could use the information in a SIP INVITE request sent to the S-CSCF.

In an embodiment, the data could be stored in an XML format in a network node. The following tables contain examples of an XML format for the data.

| Data type | Tag | Base type | Comments |
|---|---|---|---|
| tType | type | enumerated | Possible values: emergency |
| tPSAccess | N.A. | Enumerated | Possible values: IEEE-802.11 IEEE-802.11a IEEE-802.11b IEEE-802.11g IEEE-802.11n 3GPP-GERAN 3GPP-UTRAN-FDD 3GPP-UTRAN-TDD ADSL ADSL2 ADSL2+ RADSL SDSL HDSL HDSL2 G.SHDSL VDSL IDSL 3GPP2-1X 3GPP2-1X-HRPD DOCSIS 3GPP-UTRAN EVDO CDMA1X WiMAX other |
| tCSAccess | N.A. | enumerated | Possible values: 3GPP-GERAN 3GPP-UTRAN other |

| Data type | Tag | Tag | | Type | Cardinality |
|---|---|---|---|---|---|
| | | Compound of | | | |
| tIMS3GPP | ims-3gpp | Choice of | alternative-service | tAnternativeService | (0 to 1) |
| | | | service-info | String | (0 to 1) |
| tAlternativeService | N.A. | type | | tType | (1) |
| | | action | | tAction | (0 to 1) |
| | | reason | | String | (1) |
| tAction | N.A. | emergency-registration | | N.A. | (0 to 1) |
| | | domain-transfer | | tDomainTransfer | (0 to 1) |
| tDomainTransfer | N.A. | cschoice of | psgroup    cs | tCS | (0 to n) |
| | | | ps | tPS | (0 to n) |
| | | | other | N.A. | (0 to 1) |
| tPS | N.A. | N.A. | | List of tPSAccess Attribute | N.A. |
| | | emergency-registration | | boolean | (0 to 1) |
| tCS | N.A. | N.A. | | List of tCSAccess | N.A. |

NOTE:
"n" shall be interpreted as non-bounded.

Figure 5:
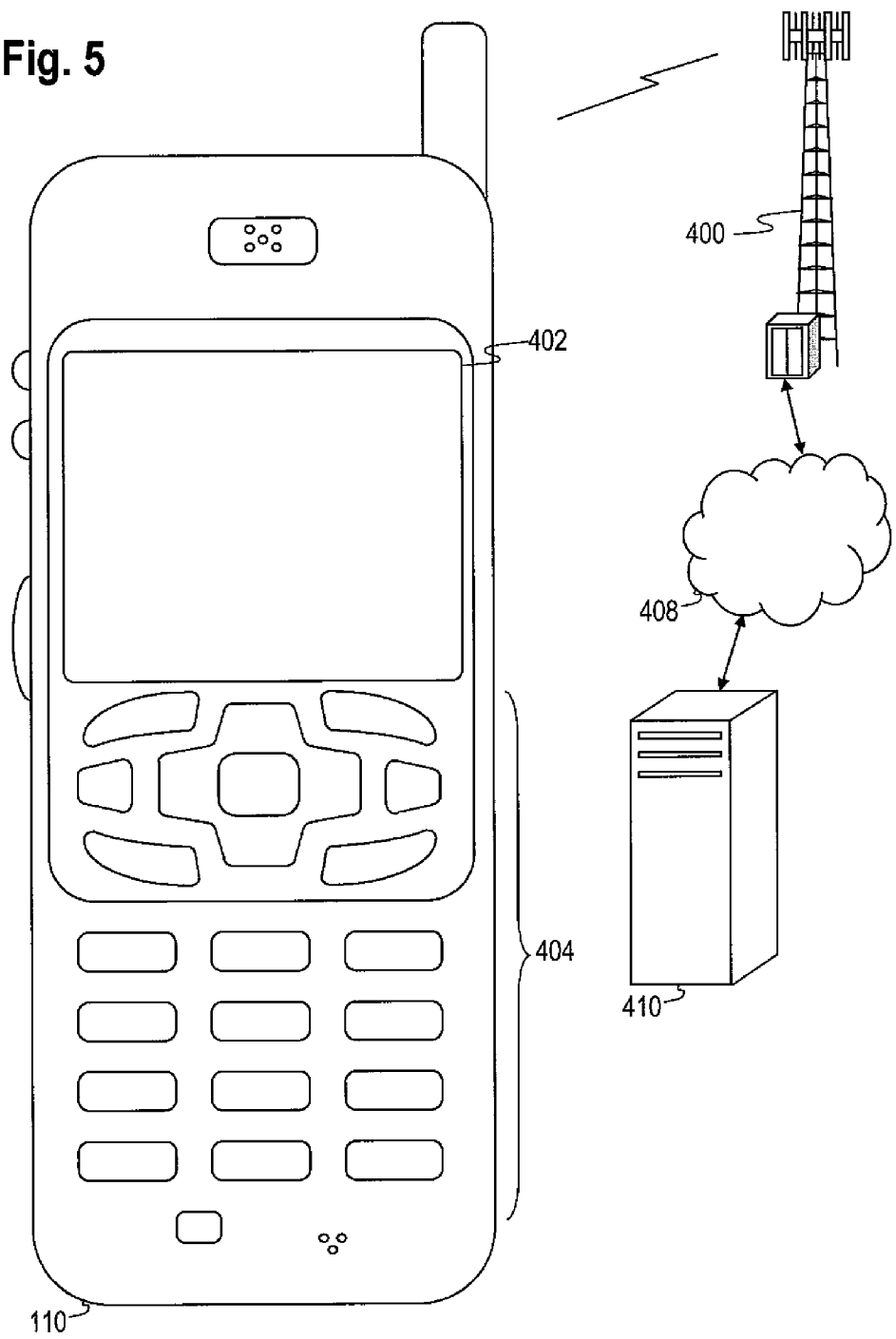
FIG. 5 is a diagram of a wireless communications system including a UA operable for some of the various embodiments of the disclosure.

FIG. 5 illustrates a wireless communications system including an embodiment of the UA 110. The UA 110 is operable for implementing aspects of the disclosure, but the disclosure should not be limited to these implementations. Though illustrated as a mobile phone, the UA 110 may take various forms including a wireless handset, a pager, a personal digital assistant (PDA), a portable computer, a tablet computer, or a laptop computer. Many suitable devices combine some or all of these functions. In some embodiments of the disclosure, the UA 110 is not a general purpose computing device like a portable, laptop or tablet computer, but rather is a special-purpose communications device such as a mobile phone, wireless handset, pager, or PDA. In another embodiment, the UA 110 may be a portable, laptop or other computing device. The UA 110 may support specialized activities such as gaming, inventory control, job control, and/or task management functions, and so on.

The UA 110 includes a display 402. The UA 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 110 may present options for the user to select, controls for the user to actuate, and/or cursors or other indicators for the user to direct. The UA 110 may further accept data entry from the user, including numbers to dial or various parameter values for configuring the operation of the UA 110. The UA 110 may further execute one or more software or firmware applications in response to user commands. These applications may configure the UA 110 to perform various customized functions in response to user interaction. Additionally, the UA 110 may be programmed and/or configured over-the-air, for example from a wireless base station, a wireless access point, or a peer UA 110.

Among the various applications executable by the UA 110 are a web browser, which enables the display 402 to show a web page. The web page may be obtained via wireless communications with a wireless network access node, a cell tower, a peer UA 110, or any other wireless communication network or system 400. The network 400 is coupled to a wired network 408, such as the Internet. Via the wireless link and the wired network, the UA 110 has access to information on various servers, such as a server 410. The server 410 may provide content that may be shown on the display 402. Alternately, the UA 110 may access the network 400 through a peer UA 110 acting as an intermediary, in a relay type or hop type of connection.

FIG. 6 shows a block diagram of the UA 110. While a variety of known components of UAs 110 are depicted, in an embodiment a subset of the listed components and/or additional components not listed may be included in the UA 110. The UA 110 includes a digital signal processor (DSP) 502 and a memory 504. As shown, the UA 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UA 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UA 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UA 110 to send and receive information from a cellular network or some other available wireless communications network or from a peer UA 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UA 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UA 110 and may also enable the UA 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UA 110 to communicate wirelessly with other nearby UAs and/or wireless base stations.

The input/output interface 518 may further connect the DSP 502 to the alert 526 that, when triggered, causes the UA 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UA 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UA 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UA 110 to determine its position. Various other peripherals may also be included to provide additional functions, e.g., radio and television reception.

FIG. 7 illustrates a software environment 602 that may be implemented by the DSP 502. The DSP 502 executes operating system drivers 604 that provide a platform from which the rest of the software operates. The operating system drivers 604 provide drivers for the node hardware with standardized interfaces that are accessible to application software. The operating system drivers 604 include application management services ("AMS") 606 that transfer control between applications running on the UA 110. Also shown in FIG. 7 are a web browser application 608, a media player application 610, and Java applets 612. The web browser application 608 configures the UA 110 to operate as a web browser, allowing a user to enter information into forms and select links to retrieve and view web pages. The media player application 610 configures the UA 110 to retrieve and play audio or audiovisual media. The Java applets 612 configure the UA 110 to provide games, utilities, and other functionality. A component 614 might provide functionality described herein.

Figure 8:
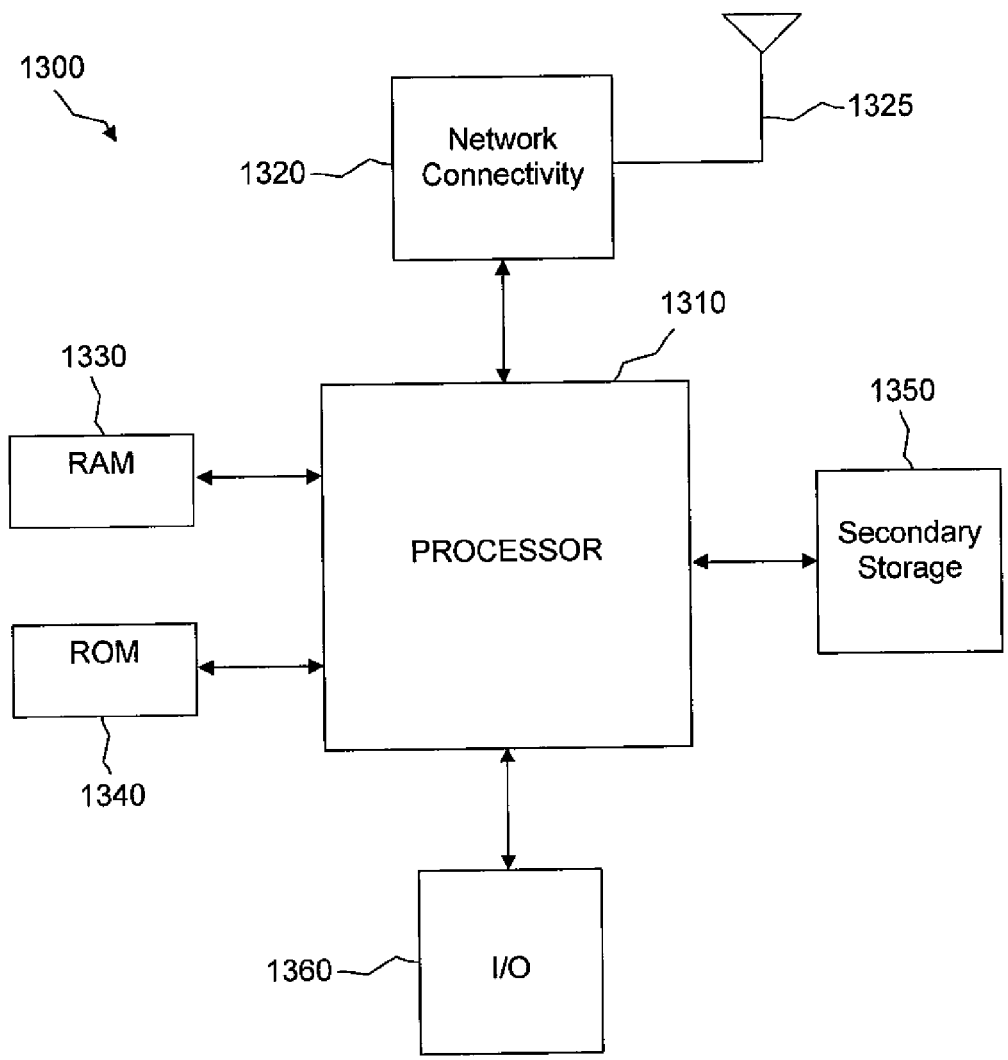
FIG. 8 illustrates an exemplary general-purpose computer system suitable for implementing the several embodiments of the present disclosure.

The UA 110 and other components described above might include a processing component that is capable of executing instructions related to the actions described above. FIG. 8 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) and/or global system for mobile communications (GSM) radio transceiver devices, and other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 110, such as the display 402 and the input 404.

The following 3rd Generation Partnership Project (3GPP) Technical Specification (TS) is incorporated herein by reference: TS 24.008.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing a user agent (UA) with configuration data for a subsequent session, comprising:
sending a first setup message by the UA over a first control signaling to control a second control signaling;
sending a second setup message by the UA via the second control signaling, the second setup message initiating procedures to establish a circuit switched-based bearer; and sending the UA a control message by a network component via the first control signaling indicating that a session has been established, the control message containing information related to configuration data for a subsequent session.

2. The method of claim 1, wherein the first setup message follows a packet switched protocol and the second setup message follows a circuit switched protocol.

3. The method of claim 1, wherein the first setup message follows a circuit switched protocol and the second setup message follows a packet switched protocol.

4. The method of claim 1, wherein the information related to configuration data for a subsequent session is at least one of:
   at least one session identifier for the subsequent session; and
   a location where the UA can retrieve at least one session identifier for the subsequent session.

5. The method of claim 4, wherein the UA retrieves the at least one session identifier using a hypertext transfer protocol (HTTP) GET command.

6. The method of claim 1, wherein the control message is a Session Initiation Protocol (SIP) 200 (OK) response.

7. The method of claim 1, wherein the information related to configuration data for a subsequent session is at least one of:
   at least one E.164 number for a subsequent session originated by the UA;
   at least one E.164 number for a subsequent session terminated at the UA; and
   at least one E.164 number for voice call continuity invocation.

8. The method of claim 7, wherein the at least one E.164 number is valid for a limited length of time.

9. The method of claim 1, wherein the information related to configuration data is valid for a limited time.

10. A user agent (UA), comprising:
    a processor configured to send a first setup message over a first control signalling to control a second control signalling, further configured to send a second setup message via the second control signalling, the second setup message initiating procedures to establish a circuit switched-based bearer, and further configured to receive a control message via the first control signalling indicating that a session has been established, the control message containing information related to configuration data for a subsequent session.

11. The UA of claim 10, wherein the first setup message follows a packet switched protocol and the second setup message follows a circuit switched protocol.

12. The UA of claim 10, wherein the first setup message follows a circuit switched protocol and the second setup message follows a packet switched protocol.

13. The UA of claim 10, wherein the information related to configuration data for a subsequent session is at least one of:
    at least one session identifier for the subsequent session; and
    a location where the UA can retrieve at least one session identifier for the subsequent session.

14. The UA of claim 13, wherein the UA retrieves the at least one session identifier using a hypertext transfer protocol (HTTP) GET command.

15. The UA of claim 10, wherein the control message is a Session Initiation Protocol (SIP) 200 (OK) response.

16. The UA of claim 10, wherein the information related to configuration data for a subsequent session is at least one of:
    at least one E.164 number for a subsequent session originated by the UA;
    at least one E.164 number for a subsequent session terminated at the UA; and
    at least one E.164 number for voice call continuity invocation.

17. The UA of claim 16, wherein the at least one E.164 number is valid for a limited length of time.

18. The UA of claim 10, wherein the information related to configuration data is valid for a limited time.

19. A network component, comprising:
    a processor configured to receive a first setup message that indicates that a circuit switched session is to be initiated, further configured to receive a second setup message, correlate the second setup message with the first setup message, and further configured to send a control message containing information related to configuration data for a subsequent session based on the correlation of the first setup message and the second setup message.

20. The network component of claim 19, wherein the first setup message follows a packet switched protocol and the second setup message follows a circuit switched protocol.

21. The network component of claim 19, wherein the first setup message follows a circuit switched protocol and the second setup message follows a packet switched protocol.

22. The network component of claim 19, wherein the information related to configuration data for a subsequent session is at least one of:
    at least one session identifier for the subsequent session; and
    a location where a user agent can retrieve at least one session identifier for the subsequent session.

23. The network component of claim 22, wherein the at least one session identifier is valid for a limited length of time.

24. The network component of claim 19, wherein the control message is a Session Initiation Protocol (SIP) 200 (OK) response.

25. The network component of claim 19, wherein the information related to configuration data for a subsequent session is at least one of:
    at least one session identifier for a subsequent session originated by a user agent;
    at least one session identifier for a subsequent session terminated at a user agent; and
    at least one session identifier for voice call continuity invocation.

26. The network component of claim 19, wherein the network component starts a timer upon receiving the first setup message and sends an error message indicating failure to a user agent that transmitted the first setup message when the timer expires before the network component receives the second setup message.

* * * * *